Figure 1:
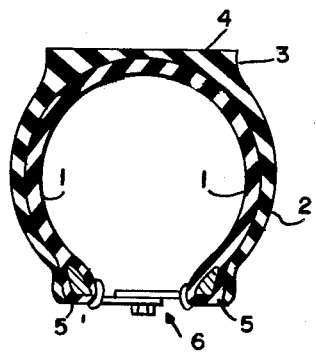

June 9, 1964

R. J. CARVER 3,136,673

METHOD AND BONDING AGENT FOR RETREADING
PNEUMATIC TIRE CASINGS

Filed May 1, 1961

INVENTOR
*Roy J. Carver*

BY *Cushman, Darby & Cushman*
ATTORNEYS

3,136,673
METHOD AND BONDING AGENT FOR RETREADING PNEUMATIC TIRE CASINGS

Roy J. Carver, Muscatine, Iowa, assignor to Bandag Incorporated, Muscatine, Iowa, a corporation of Iowa
Filed May 1, 1961, Ser. No. 106,586
4 Claims. (Cl. 156—96)

The present invention relates to an improved method for retreading the running surface of vehicle tires and to a strip of material used in that process.

The invention is an improvement over the method and material for retreading pneumatic tire casings disclosed and claimed in Patent No. 2,976,910, issued March 28, 1961. In that patent there is disclosed a method for retreading the surface of a pneumatic tire in which old tread material is first stripped away to prepare a crown on which the new tread is placed, and a preformed tread strip is adhered to this crown by a composition containing two components. The two components react with each other and are not brought together until immediately prior to use. Normally, the two components are a vulcanizing agent, such as sulphur, and a vulcanization accelerator.

In carrying out that process according to one of the preferred procedures, the crown is, after preparation, first covered with a gummy solution containing either the vulcanizing agent or the accelerator, and certain other ingredients to give body. Then a cushion gum material is applied, and this includes the vulcanizing agent or accelerator depending upon what was included in the said gummy solution. On top of these is placed a preformed tread strip, pressure is applied and cold vulcanization takes place, either at room temperature or slightly elevated temperatures.

While this process has proved extremely successful, certain difficulties have arisen because of the nature of the retreading industry, in which it is common for retreading to be practiced locally by tire distributors and other similar organizations. The amount of equipment available to such retreaders is limited, and some difficulty at times has been found in attempting to provide a uniform bond between the new tread and the tire casing. In particular, the gummy solution which is applied to the crown has not been applied uniformly, or in proper amounts. This leads to difficulties, since the application of the correct amount of solution is necessary to provide an adequate bond and also to assure uniformity of bonding across the entire surface of the tire. Failure to provide uniformity may lead to differences in the strength of bonding between adjacent portions of the periphery of the tire, and local stresses may be set up which would tend to rupture the bond. Of course, uniformity is possible when expensive coating apparatus is employed, but because of the nature of retreading industry, such equipment cannot always be provided. The present invention provides a method for overcoming this difficulty to facilitate the practice of the invention described in the aforesaid application, particularly by local retreaders with limited equipment.

Accordingly, the object of the present invention is to provide an improved method for retreading tires using a preformed tread strip.

Another object is retreading by interposing between the crown and a preformed tread strip, two uniformly thick strips of material, each containing one of two components which react on contact with each other to form a bond.

Other objects and purposes will be apparent from the following description and the appended claims.

In accordance with this invention, at least one of the materials to be used for the bonding reaction is incorporated in the strip of material of uniform thickness. Preferably, the other material used is incorporated as a coating on the tread strip at the factory, although it too may be in the form of a preformed strip of uniform thickness.

Figure 2:
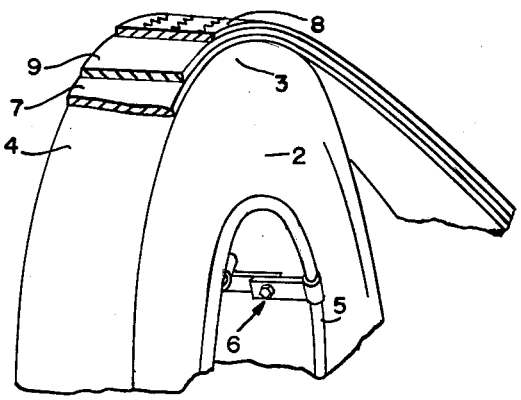
Figure 3:
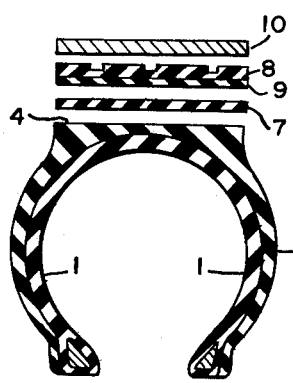
Figure 4:
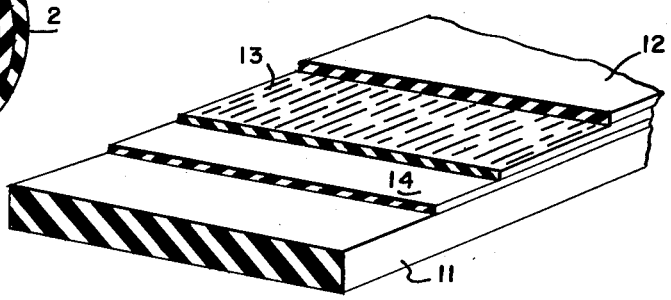
Figure 5:
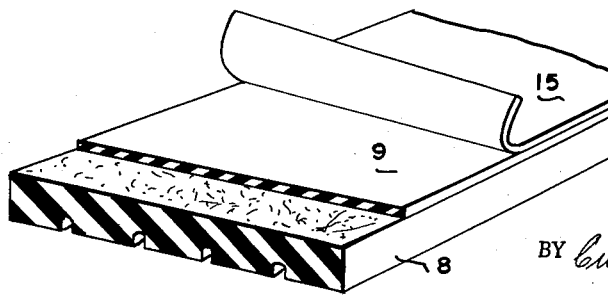

The invention may be more fully understood from the following description of preferred embodiments, and from the drawing, in which:

FIGURE 1 shows a pneumatic tire casing prepared for retreading;
FIGURE 2 shows in perspective the practice of the invention;
FIGURE 3 is an exploded view of the several materials which are bonded together;
FIGURE 4 shows the layers assembled in making a preformed tread strip; and,
FIGURE 5 is a perspective view of a preformed tread strip pre-laminated with a cushion gum containing vulcanizing agent.

A tire casing is prepared for retreading as shown in FIGURE 1. It includes an inner carcass 1 protected by an outer side layer of rubber 2 and a crown portion 3. The face of the crown 4 has been prepared by retreading by buffing and other suitable operations. To perform the retreading procedure, it is preferred that the side walls be spread apart at their inner edges 5 and 5' to flatten the outer face of the crown, since this facilitates application of the new tread to the carcass. Conventional spreaders shown generally at 6 may be used for this purpose, and any apparatus of equivalent function also may be used.

In accordance with the invention, a laminate including the tread strip and bonding agents is next applied to the casing. Preferably it is adhered by a gossamer thin layer of ordinary rubber cement or a solution of cushion gum. The laminate includes a strip of material 7, a tread strip 8 and a cushion gum 9. Strip 7 contains one of the two reacting materials, such as a vulcanizing accelerator. The tread strip 8 has previously been laminated with a uniformly thick layer of cushion gum 9 containing the other reacting material and is generally made available as a roll of continuous tread. The circumference of the tire is measured and a length of tread strip and cushion gum is cut. The cushion gum usually will be covered with a polyethylene sheet, and this is peeled away. An appropriate length of strip material 7 is cut and pressed against the cushion gum 9. Any air between strip 7 and the cushion gum is forced out by rolling with a band tread stitcher. Then the polyethylene or other backing on strip 7 is peeled off and the laminate is applied to the tire crown, previously coated with cement. A steel band 10 is secured around the assembly, to apply pressure to the tread strip, and the tire is inflated to approximately normal operating pressure. If desired, the assembly can be heated, e.g., to less than 200° F. for five hours of less to accelerate curing, all of which being more fully disclosed in Patent No. 2,976,910. This results in sufficient pressure at room temperature or such elevated temperatures to effect the bonding of the tread strip to the tire crown by cold vulcanization.

The preformed tread strip 8 is preferably formed from caoutchouc or synthetic caoutchouc rubber which has been molded and completely cured in a vulcanizing press under an external pressure of between 300 and 1000 pounds per square inch, but preferably above 600 pounds per square inch and at a suitable vulcanizing temperature preferably between 315° and 330° F. Additionally, the retread material may be reinforced by an imbedded ply of cord or metallic threads. As shown in FIGURE 4, the individual layers of a reinforced tread strip may be assembled for prevulcanization and generally include a thick outer cover 11 and a thin layer 12 of uncured rubber separated by an intermediate layer or ply 13 of reinforcing threads. A sheet 14 of cushion gum has been interposed between the outer cover 11 and the reinforcing layer 13 so that the assembled layers will fuse together, when subjected to high pressure vulcanization to form a unitary reinforced tread strip. While the tread material is being molded under high pressure, as in a vulcanizing press, a profiled tread design may be formed in the outer cover layer 11 by a suitable die.

To the inner surface of this tread strip, the layer of material 9, which is a cushion gum material, may be applied, and this may include, or carry as an additional coating, one of the compositions containing one of the reacting ingredients. Applying the cushion gum and one of the reactants as a preformed layer on the inner surface of the tread strip has the advantage that a uniform coating may be applied at the factory for use in the field. This cushion gum 9 is about 0.015 gauge and preferably is bonded to the tread strip, after the tread strip is formed, by first roughening and coating the inner surface of the later with a diluted gum solution. Next, a thin sheet or layer 9 of uncured cushion gum is applied directly to the inner surface and it will become locally bonded to the tread strip 8 by the surface reaction between the self-vulcanizing components. The exposed surface of the uncured cushion gum layer 9 is then covered by an easily removable protective layer 15 of impregnated paper, cellophane or the like. The combined prevulcanized tread and cushion gum may be commercially produced in the form of rolls which may be safely stored at normal temperatures up to about 40° C. (104° F.) for several months without fear of a premature vulcanization reaction.

The composition which may be incorporated in the cushion gum will be referred to as component A, and it may have a composition as follows:

| | Parts by weight |
|---|---|
| Smoked sheet | 100 |
| Carbon black | 25 |
| Pine tar | 6 |
| Zinz oxide | 8 |
| Sulfur | 5.8 |
| Softener | 0.5 |
| Hydro oil | 1 |
| Stearic acid | 0.625 |
| Anti oxidants | 3 |
| | 149.925 |

Another composition is:

| | Parts by weight |
|---|---|
| Smoked sheet | 100 |
| Philblack A[1] | 12.5 |
| Philblack O[2] | 12.5 |
| Pine tar | 6 |
| Zinc oxide | 8 |
| Agerite resin[3] | 1 |
| NATAC[4] | .5 |
| Hydro oil | 1 |
| BLE[5] | 1 |
| Thermoflex A[5] | 1 |
| Amorphous insoluble sulfur | 5.8 |
| | 149.3 |

[1] A medium abrasion furnace black.
[2] A high abrasion furnace black.
[3] Aldol alphanaphthylamide. A rubber anti-oxidant consisting of cherry-red resin with a faint odor. Specific gravity 1.08, melting point 100–120° C.
[4] A non-retarding, resin-acid-type softener for rubber.
[5] Rubber anti-oxidants.

As previously stated, the second reacting component is incorporated in a strip of material of uniform thickness, and width approximately the same as the preformed tread strip. The thickness of this strip should be about 0.015 gauge. A suitable material is a cushion gum containing the following composition dispersed therein:

| | |
|---|---|
| Smoked sheet | 100 |
| Philblack A | 12.5 |
| Philblack O | 12.5 |
| Pine tar | 6 |
| Zinc oxide | 8 |
| Agerite resin | 1 |
| NATAC | 0.5 |
| Hydro oil | 1.0 |
| Stearic acid | 0.625 |
| BLE | 1.0 |
| Thermoflex | 1.0 |
| Zinc ethylphenyl dithiocarbamate[1] | 0.8 |
| N-cyclohexylethyl ammonium cyclohexyl dithiocarbamate[1] | 0.8 |
| | 145.725 |

[1] Vulcanization accelerators.

Other accelerators may be used such as cyclohexyl ethylamine. This strip is, as stated, placed above the prepared crown and glued thereto with, for example, conventional rubber cement. Only a very thin film of cement is necessary, and the film may be rolled out. In fact, the strip has a certain tackiness and will tend to stick somewhat even without cement.

Preferably, the strip is prepared on a backing layer, for example of the following plastics, to wit, polyethylene (and is then cemented onto the tire casing). The backing strip may be then peeled away leaving the tire casing ready for covering with the laminate of preformed tread strip and cushion gum.

The above embodiments are preferred, but it will be obvious that certain variations and modifications may be made without departing from the scope of the invention, as set forth in the claims. It will be obvious that the several embodiments described in Patent No. 2,976,910, may also be used.

What is claimed is:

1. A method of retreading the road-engaging surface of a rubber tire comprising applying a preformed vulcanized rubber tread strip to said road-engaging surface, interposing between said road-engaging surface and said preformed tread strip a preformed strip of substantially uniform thickness comprising unvulcanized rubber containing one component of a two-component self-bonding composition capable of vulcanizing at temperatures below about 150° C. and a second preformed strip of substantially uniform thickness comprising unvulcanized rubber containing the second component of said self-bonding composition, said two components being normally in a stabilized condition and being kept apart until just prior to use for preventing premature interaction thereof, and subjecting the resultant retread tire assembly to an external pressure at least about equal to normal tire pressure at a temperature below about 150° C. to obtain a uniform bond between said road-engaging surface and said preformed tread strip.

2. A method of retreading as set forth in claim 1 in which one of said components is a vulcanizing agent and the other is a vulcanizing accelerator.

3. A method of retreading as set forth in claim 2 in which said vulcanizing agent is sulfur.

4. A method of retreading as set forth in claim 1 in which one of said strips of unvulcanized rubber is first laminated to said preformed tread strip.

References Cited in the file of this patent
UNITED STATES PATENTS

| 2,495,175 | Nagel | Jan. 17, 1950 |
| 2,639,258 | Evans et al. | May 19, 1953 |
| 2,713,884 | Schwartz | July 26, 1955 |
| 2,803,283 | Gruber | Aug. 20, 1957 |
| 2,976,910 | Nowak | Mar. 28, 1961 |
| 2,984,281 | Kraus | May 16, 1961 |
| 3,063,891 | Boylan et al. | Nov. 13, 1962 |